US009129185B1

(12) United States Patent
Murata

(10) Patent No.: US 9,129,185 B1
(45) Date of Patent: Sep. 8, 2015

(54) SYSTEM AND METHOD FOR REDUCING IMAGE CLUTTER

(75) Inventor: Ronald N. Murata, Normandy Park, WA (US)

(73) Assignee: THE BOEING COMPANY, Chicago, IL (US)

(*) Notice: Subject to any disclaimer, the term of this patent is extended or adjusted under 35 U.S.C. 154(b) by 477 days.

(21) Appl. No.: 13/476,576

(22) Filed: May 21, 2012

(51) Int. Cl.
G06K 9/40 (2006.01)
(52) U.S. Cl.
CPC ........................................ G06K 9/40 (2013.01)
(58) Field of Classification Search
None
See application file for complete search history.

(56) References Cited

U.S. PATENT DOCUMENTS

| | | | | |
|---|---|---|---|---|
| 4,064,511 A | * | 12/1977 | Manfanovsky | 342/102 |
| 4,499,597 A | * | 2/1985 | Alves | 382/205 |
| 6,804,408 B1 | * | 10/2004 | Gallagher et al. | 382/272 |
| 7,652,788 B2 | * | 1/2010 | Foi et al. | 358/1.6 |
| 8,023,766 B1 | * | 9/2011 | Bergman et al. | 382/275 |
| 8,355,064 B2 | * | 1/2013 | van Beek | 348/241 |
| 8,447,108 B2 | * | 5/2013 | Park | 382/171 |
| 8,611,696 B1 | * | 12/2013 | Zhu et al. | 382/284 |
| 2002/0035323 A1 | * | 3/2002 | Saha et al. | 600/410 |
| 2003/0021187 A1 | * | 1/2003 | Wagstaff et al. | 367/135 |
| 2003/0210810 A1 | * | 11/2003 | Gee et al. | 382/128 |
| 2004/0057632 A1 | * | 3/2004 | Gindele | 382/274 |
| 2006/0050783 A1 | * | 3/2006 | Le Dinh et al. | 375/240.2 |
| 2006/0245667 A1 | * | 11/2006 | Lertrattanapanich et al. | 382/275 |
| 2007/0132865 A1 | * | 6/2007 | Adams et al. | 348/242 |
| 2009/0033773 A1 | * | 2/2009 | Kinoshita et al. | 348/241 |
| 2009/0092307 A1 | * | 4/2009 | Sabol et al. | 382/132 |
| 2009/0309998 A1 | * | 12/2009 | Grosvenor et al. | 348/241 |
| 2011/0001850 A1 | * | 1/2011 | Gaubatz et al. | 348/241 |
| 2012/0050093 A1 | * | 3/2012 | Heilmann et al. | 342/173 |
| 2012/0236184 A1 | * | 9/2012 | Jia et al. | 348/241 |

FOREIGN PATENT DOCUMENTS

WO    WO2010038195 A2 *  4/2010
WO    WO2012044311 A1 *  4/2012

OTHER PUBLICATIONS

Garcia, "Robust smoothing of gridded data in one and higher dimensions with missing values," Computational Statistics and Data Analysis, vol. 54, Issue 4, Apr. 2010, pp. 1167-1178.
Klick et al., "Detection of targets in infrared clutter," Targets and Backgrounds VII: Characterization and Representation, Wendell Watkins editor, SPIE Proceedings, vol. 4370, Sep. 2001, pp. 120-133.
Takezawa, "Multidimensional Smoothing," Introduction to Nonparametric Regression, Chapter 4, A. John Wiley & Sons, Inc., Publication, copyright 2006, pp. 231-287.

* cited by examiner

Primary Examiner — Michelle Entezari
(74) Attorney, Agent, or Firm — Yee & Associates, P.C.

(57) ABSTRACT

A method and system for reducing clutter in a number of images. Sub-image pixel values are identified for a sub-image at a location in an image in the number of images. A first portion of the sub-image pixel values corresponds to a number of suspected target pixels in the sub-image. A second portion of the sub-image pixel values corresponds to clutter pixels in the sub-image. Modeled pixel values are generated using a clutter model fitted to the second portion of the sub-image pixel values. The modeled pixel values are subtracted from the sub-image pixel values to form new pixel values.

16 Claims, 11 Drawing Sheets

| $c_{1,1} := 121\text{-}25$ | $c_{1,2} := 0$ | $c_{1,3} := 0$ | $c_{1,4} := \sum_{i=-5}^{5} \sum_{j=-5}^{5} i^2 \cdot \sum_{i=-2}^{2} \sum_{j=-2}^{2} i^2$ | $c_{1,5} := c_{1,4}$ | $c_{1,6} := 0$ |
|---|---|---|---|---|---|
| $c_{2,1} := c_{1,2}$ | $c_{2,2} := c_{1,4}$ | $c_{2,3} := 0$ | $c_{2,4} := 0$ | $c_{2,5} := 0$ | $c_{2,6} := 0$ |
| $c_{3,1} := 0$ | $c_{3,2} := 0$ | $c_{3,3} := c_{2,2}$ | $c_{3,4} := 0$ | $c_{3,5} := 0$ | $c_{3,6} := 0$ |
| $c_{4,1} := c_{2,2}$ | $c_{4,2} := 0$ | $c_{4,3} := 0$ | $c_{4,4} := \sum_{i=-5}^{5} \sum_{j=-5}^{5} i^4 \cdot \sum_{i=-2}^{2} \sum_{j=-2}^{2} i^4$ | $c_{4,5} := \sum_{i=-5}^{5} \sum_{j=-5}^{5} (i^2 \cdot j^2) \cdot \sum_{i=-2}^{2} \sum_{j=-2}^{2} (i^2 \cdot j^2)$ | $c_{4,6} := 0$ |
| $c_{5,1} := c_{4,1}$ | $c_{5,2} := 0$ | $c_{5,3} := 0$ | $c_{5,4} := c_{4,5}$ | $c_{5,5} := c_{4,4}$ | $c_{5,6} := 0$ |
| $c_{6,1} := 0$ | $c_{6,2} := 0$ | $c_{6,3} := 0$ | $c_{6,4} := 0$ | $c_{6,5} := 0$ | $c_{6,6} := c_{4,5}$ |

1200

\*

| aout | bout | cout | dout | eout | fout |
|---|---|---|---|---|---|

1202

=

| $r_1' := \sum_{i=-5}^{5} \sum_{j=-5}^{5} d_{i,j} - \sum_{i=-2}^{2} \sum_{j=-2}^{2} d_{i,j}$ | $r_2' := \sum_{i=-5}^{5} \sum_{j=-5}^{5} (d_{i,j} \cdot i) - \sum_{i=-2}^{2} \sum_{j=-2}^{2} (d_{i,j} \cdot i)$ | $r_3' := \sum_{i=-5}^{5} \sum_{j=-5}^{5} (d_{i,j} \cdot i) - \sum_{i=-2}^{2} \sum_{j=-2}^{2} (d_{i,j} \cdot i)$ | $r_4' := \sum_{i=-5}^{5} \sum_{j=-5}^{5} (d_{i,j} \cdot i^2) - \sum_{i=-2}^{2} \sum_{j=-2}^{2} (d_{i,j} \cdot i^2)$ | $r_5' := \sum_{i=-5}^{5} \sum_{j=-5}^{5} (d_{i,j} \cdot i^2) - \sum_{i=-2}^{2} \sum_{j=-2}^{2} (d_{i,j} \cdot i^2)$ | $r_6' := \sum_{i=-5}^{5} \sum_{j=-5}^{5} (d_{i,j} \cdot i \cdot i) - \sum_{i=-2}^{2} \sum_{j=-2}^{2} (d_{i,j} \cdot i \cdot i)$ |
|---|---|---|---|---|---|

| 1200 | | | | | |
|---|---|---|---|---|---|
| $c_{1,1} = 96$ | $c_{1,2} = 0$ | $c_{1,3} = 0$ | $c_{1,4} = 1.16 \times 10^3$ | $c_{1,5} = 1.16 \times 10^3$ | $c_{1,6} = 0$ |
| $c_{2,1} = 0$ | $c_{2,2} = 1.16 \times 10^3$ | $c_{2,3} = 0$ | $c_{2,4} = 0$ | $c_{2,5} = 0$ | $c_{2,6} = 0$ |
| $c_{3,1} = 0$ | $c_{3,2} = 0$ | $c_{3,3} = 1.16 \times 10^3$ | $c_{3,4} = 0$ | $c_{3,5} = 0$ | $c_{3,6} = 0$ |
| $c_{4,1} = 1.16 \times 10^3$ | $c_{4,2} = 0$ | $c_{4,3} = 0$ | $c_{4,4} = 2.137 \times 10^4$ | $c_{4,5} = 1.2 \times 10^4$ | $c_{4,6} = 0$ |
| $c_{5,1} = 1.16 \times 10^3$ | $c_{5,2} = 0$ | $c_{5,3} = 0$ | $c_{5,4} = 1.2 \times 10^4$ | $c_{5,5} = 2.137 \times 10^4$ | $c_{5,6} = 0$ |
| $c_{6,1} = 0$ | $c_{6,2} = 0$ | $c_{6,3} = 0$ | $c_{6,4} = 0$ | $c_{6,5} = 0$ | $c_{6,6} = 1.2 \times 10^4$ |

$*$

| 1202 |
|---|
| aout = $6.83 \times 10^3$ |
| bout = $-0.484$ |
| cout = $15.832$ |
| dout = $-0.257$ |
| eout = $0.08$ |
| fout = $0.59$ |

$=$

| 1204 |
|---|
| $r_1 = 6.555 \times 10^3$ |
| $r_2 = -562$ |
| $r_3 = 1.837 \times 10^4$ |
| $r_4 = 7.919 \times 10^6$ |
| $r_5 = 7.922 \times 10^6$ |
| $r_6 = 7.074 \times 10^3$ |

FIG. 13

FIG. 14
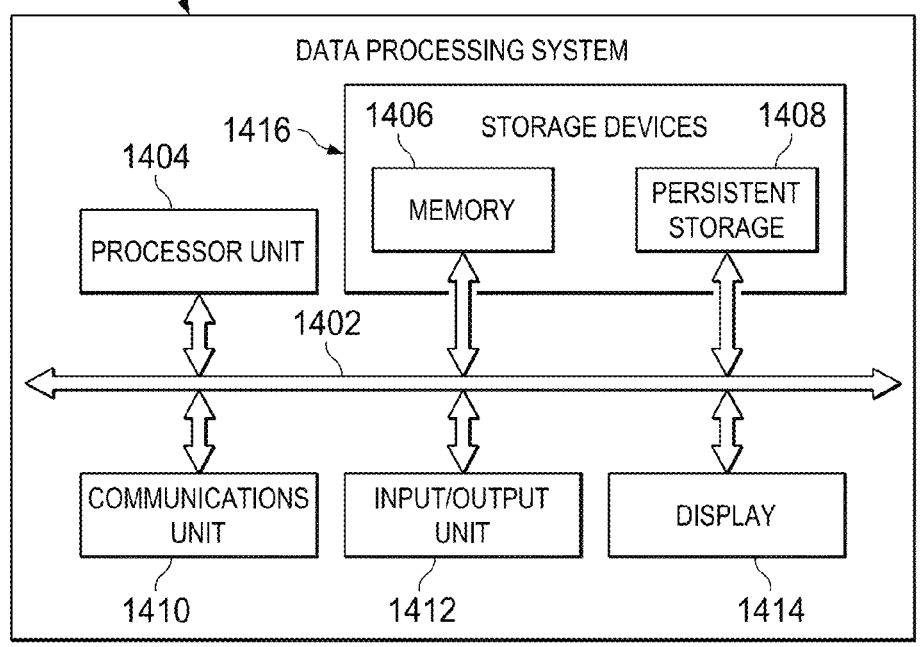
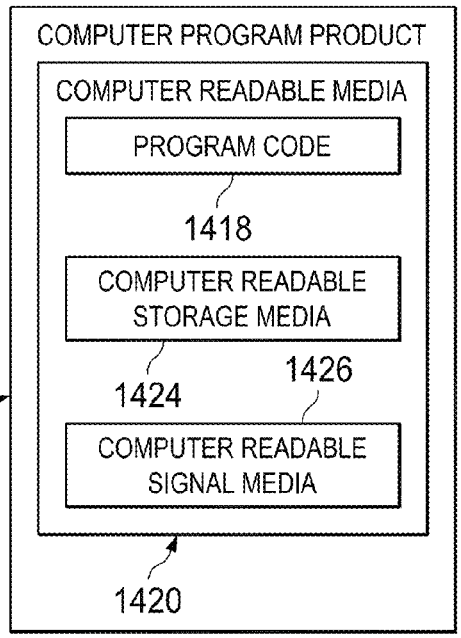

SYSTEM AND METHOD FOR REDUCING IMAGE CLUTTER

BACKGROUND INFORMATION

1. Field

The present disclosure relates generally to processing images and, in particular, to reducing clutter in images. Still more particularly, the present disclosure relates to a method and apparatus for reducing clutter that changes with respect to space and time in a number of images.

2. Background

Sensor systems are commonly used to detect target objects. As used herein, a "target object" is an object of interest. The object of interest may be, for example, without limitation, an aircraft, an unmanned aerial vehicle (UAV), a projectile, a watercraft, a spacecraft, a vehicle, a weather phenomenon, a living organism, or some other suitable type of object.

Typically, the sensor system used to detect a target object is configured to detect electromagnetic radiation and convert this electromagnetic radiation into electrical signals that can be used to form images. These images may be, for example, without limitation, radar images, infrared images, ultraviolet images, visible light images, or other suitable types of images.

In some situations, a portion of the electromagnetic radiation detected by the imaging system is undesired electromagnetic radiation. Some or all of this undesired electromagnetic radiation may be clutter. As used herein, "clutter" describes electromagnetic radiation reflecting off of and/or emanating from sources that are not target objects. These sources may include, for example, without limitation, the ground, the surface of a body of water, precipitation, radar countermeasures, atmospheric turbulences, weather conditions, trees, foliage, waves, animals, birds, insects, and other types of sources other than a target object.

The presence of clutter in an image may make detecting a target object in the image more difficult than desired. Some currently available solutions for reducing the clutter in an image use spatial filters, spatial-temporal filters, and/or spatial-spectral filters. These different types of filters may use fixed weights to characterize the clutter in an image. However, with fixed weights, these types of filters may be unable to characterize the variations of clutter in different locations in an image with a desired level of accuracy. Consequently, the solutions using these types of filters may be unable to provide a desired level of reduction in clutter throughout the entire image.

Further, when used to reduce clutter in a sequence of images generated over time, filters that use fixed weights to characterize clutter may not take into account changes in the clutter over time. Clutter that changes over time may be referred to as non-stationary clutter. Some currently available solutions for reducing clutter that use filters with fixed weights may be unable to provide the desired level of reduction in clutter in all of the images in a sequence of images. Therefore, it would be desirable to have a method and apparatus that takes into account at least some of the issues discussed above, as well as other possible issues.

SUMMARY

In one illustrative embodiment, a method is present for reducing clutter in a number of images. Sub-image pixel values are identified for a sub-image at a location in an image in the number of images. A first portion of the sub-image pixel values corresponds to a number of suspected target pixels in the sub-image. A second portion of the sub-image pixel values corresponds to clutter pixels in the sub-image. Modeled pixel values are generated using a clutter model fitted to the second portion of the sub-image pixel values. The modeled pixel values are subtracted from the sub-image pixel values to form new pixel values.

In another illustrative embodiment, an image processing system comprises a clutter model and a clutter reducer. The clutter reducer is configured to identify sub-image pixel values for a sub-image at a location in an image selected in which a first portion of the sub-image pixel values corresponds to a number of suspected target pixels in the sub-image and a second portion of the sub-image pixel values corresponds to clutter pixels in the sub-image, generate modeled pixel values using the clutter model fitted to the second portion of the sub-image pixel values, and subtract the modeled pixel values from the sub-image pixel values to form new pixel values.

In yet another illustrative embodiment, a computer program product for reducing clutter comprises a nontransitory computer recordable storage medium and program code stored on the nontransitory computer recordable storage medium. The program code identifies sub-image pixel values for a sub-image at a location in an image in the number of images, wherein a first portion of the sub-image pixel values corresponds to a number of target pixels in the sub-image and a second portion of the sub-image pixel values corresponds to clutter pixels in the sub-image. The program code generates modeled pixel values using a clutter model fitted to the second portion of the sub-image pixel values. The program code subtracts the modeled pixel values from the sub-image pixel values to form new pixel values.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 12 is an illustration of matrices configured for use in identifying values for parameters for a clutter model in accordance with an illustrative embodiment;

FIG. 13 is an illustration of matrices having elements for which values have been identified in accordance with an illustrative embodiment; and FIG. 14 is an illustration of a data processing system in accordance with an illustrative embodiment.

DETAILED DESCRIPTION

The different illustrative embodiments recognize and take into account one or more different considerations. For example, the different illustrative embodiments recognize and take into account that some currently available algorithms for reducing clutter in an image or a sequence of images may be unable to provide a desired level of reduction in clutter when the clutter includes non-stationary clutter. Algorithms for reducing clutter may be referred to as clutter suppression algorithms.

The different illustrative embodiments recognize and take into account that some currently available filters configured to characterize the clutter in a sequence of images may be unable to characterize the clutter with a desired level of accuracy in all of the images in the sequence of images. Consequently, the clutter suppression algorithms that use these types of filters may not reduce the clutter in all of the images in the sequence of images to within selected tolerances. In particular, residual clutter may be present in one or more images in the sequence of images.

The different illustrative embodiments also recognize and take into account that a neural network may be used to reduce the clutter in a sequence of images. In particular, a neural network may be trained to characterize the clutter in a sequence of images using a database of images. However, the different illustrative embodiments recognize and take into account that using a neural network may require more processing resources and/or time than desired.

Thus, the different illustrative embodiments provide a method and apparatus configured to reduce the clutter in a number of images. In particular, the different illustrative embodiments provide a method and apparatus for reducing clutter that changes with respect to space and time in a number of images. In some cases, the method provided by the different illustrative embodiments may be less time-consuming and may require less processing resources than currently available methods for reducing clutter.

Figure 1:
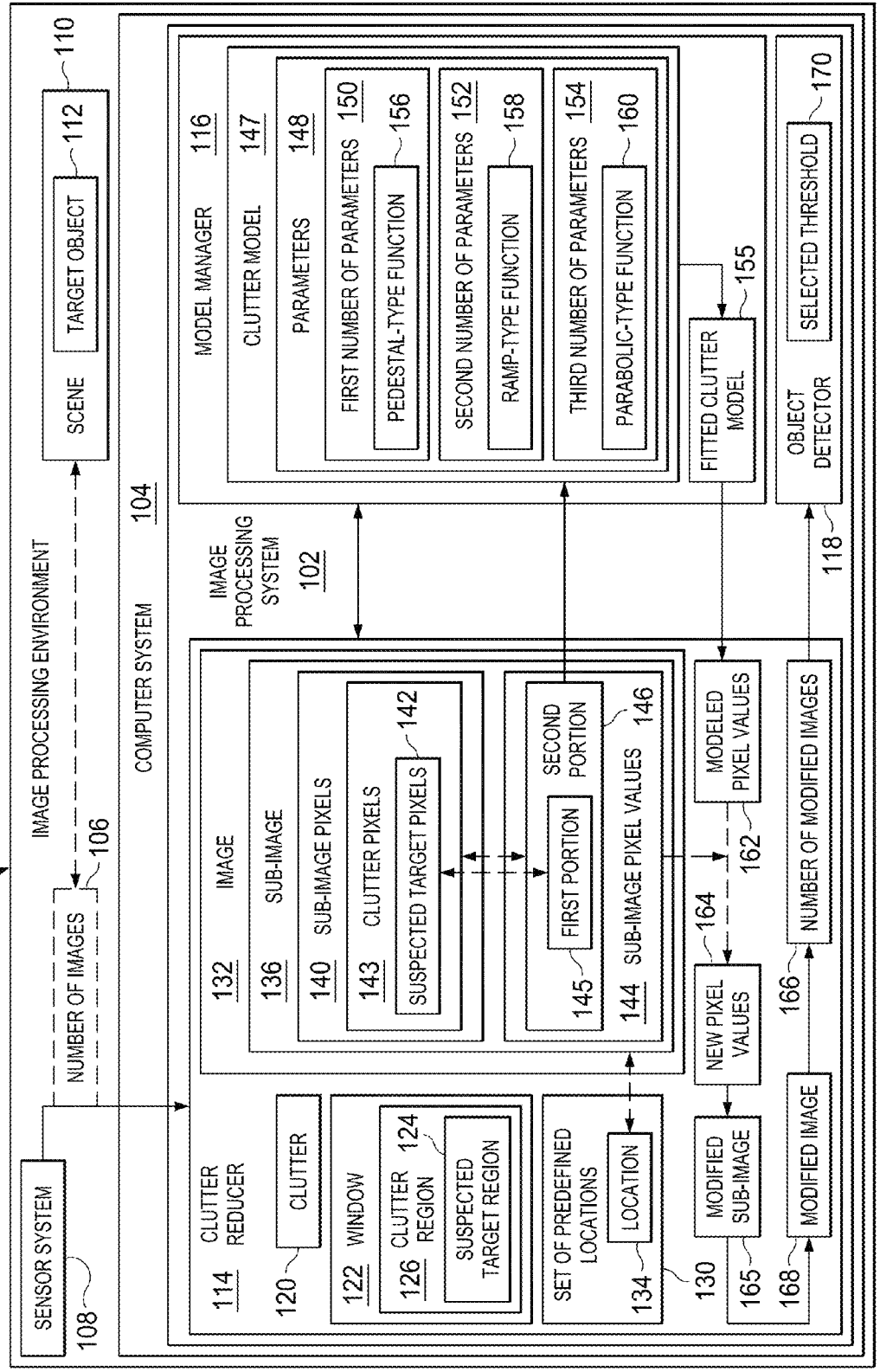
FIG. 1 is an illustration of an image processing environment in the form of a block diagram in accordance with an illustrative embodiment.

With reference now to FIG. 1, an illustration of an image processing environment in the form of a block diagram is depicted in accordance with an illustrative embodiment. In these illustrative examples, the image processing environment 100 includes an image processing system 102. The image processing system 102 may be implemented using hardware, software, or a combination of the two.

For example, the image processing system 102 may be implemented in a computer system 104. The computer system 104 may comprise one or more computers. When more than one computer is present in the computer system 104, these computers may be in communication with each other.

As depicted, the image processing system 102 is configured to receive a number of images 106 from a sensor system 108. As used herein, a "number of" items means one or more items. For example, a number of images 106 means one or more images. The sensor system 108 may be any sensor system configured to detect electromagnetic radiation, convert this electromagnetic radiation into electrical signals, and form images 106 using these electrical signals. For example, the sensor system 108 may take the form of a radar sensor system, an infrared sensor system, an ultraviolet light sensor system, a visible light imaging system, a laser imaging system, or some other type of sensor system.

When more than one image is generated by the sensor system 108, these images may be referred to as a sequence of images. As used herein, a sequence of images is two or more images ordered with respect to time. In some cases, the sequence of images may form a video.

Each of the images 106 generated by the sensor system 108 comprises an array of pixels. The array of pixels includes one or more rows of pixels and one or more columns of pixels. In these illustrative examples, the number of pixels in this array of pixels is the same for each of the images 106.

In these illustrative examples, the sensor system 108 may generate a number of images 106 for a scene 110. The scene 110 captured by the images 106 may be any area of interest. For example, the scene 110 may be an indoor scene, an outdoor scene, a neighborhood, a city, an area in a forest, an area in a manufacturing facility, a part in an inspection system, a specimen in a microscope or medical imaging device, a region of Earth observed from an aerial platform or space-based platform, a collection of objects in the air or in space, or some other suitable type of scene.

In response to receiving the images 106 of the scene 110 from the sensor system 108, the image processing system 102 processes the images 106. The image processing system 102 processes the images 106 to determine whether any target objects are present in the scene 110. A target object in the scene 110 is an object of interest. In one illustrative example, one target object 112 is present in the scene 110. This target object 112 may be captured in one, some, or all of the images 106.

The target object 112 in the scene 110 may take various forms, depending on the scene 110. For example, the target object 112 may be an aerospace vehicle, a ground vehicle, a watercraft, a projectile, a manmade structure, a light source, a weather phenomenon, a living organism, an article of clothing, a handheld object, a marker on an object, or some other suitable type of object of interest.

In these illustrative examples, the target object 112 in the scene 110 may be a point object with respect to the sensor system 108. As used herein, a "point object" is a source of electromagnetic radiation having substantially negligible dimensions with respect to the resolution power of the sensor system 108. In other words, the geometry of a point object may be approximated as a mathematical point having zero dimensions. In some cases, the point object may be referred to as being infinitesimal.

As depicted, the image processing system 102 comprises a clutter reducer 114, a model manager 116, and an object detector 118. The clutter reducer 114, the model manager 116, and the object detector 118 may each be implemented using hardware, software, or a combination of the two.

The clutter reducer 114 is configured to reduce clutter 120 in the images 106. The clutter 120 in the images 106 may also be referred to as image clutter. The clutter 120 in the images 106 is electromagnetic radiation reflecting off of and/or emanating from one or more sources that are not target objects. These sources may include, for example, without limitation, at least one of the ground, the surface of a body of water, precipitation, radar countermeasures, atmospheric turbulences, weather conditions, trees, foliage, waves, animals, birds, insects, and other types of sources that are not of interest, depending on the implementation.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; or some other suitable combination.

The clutter 120 in the images 106 may be non-stationary clutter. In other words, the clutter 120 may change with respect to space and time within the images 106. In other words, the clutter 120 in a particular image in the images 106 may be different in different locations of the particular image. Further, the clutter 120 may be different in images 106 generated at different times.

In these illustrative examples, the clutter reducer 114 is configured to reduce the clutter 120 in each of the images 106 generated by the sensor system 108 independently of the other images. For example, the clutter reducer 114 may reduce the clutter 120 in a particular image without using data generated from processing one or more previous images. A previous image is an image generated prior to the current image. In this manner, the clutter reducer 114 processes each of the images 106 independently of another one of the images 106.

In these illustrative examples, the clutter reducer 114 selects an image 132 from the images 106 generated by the sensor system 108 for processing. The first time this processing is performed, the image 132 may be the initial image of the images 106 generated by the sensor system 108 with respect to time.

The clutter reducer 114 then selects a location 134 from a set of predefined locations 130 that have been predefined for processing the image 132. As used herein, a "set of" items means one or more items. For example, the set of predefined locations 130 may include one or more locations that have been predefined for processing the image 132. Each location in the set of predefined locations 130 is a pixel location in these illustrative examples. In other words, each location in the set of predefined locations 130 corresponds to a particular pixel in the image 132.

In some cases, the number of locations in the set of predefined locations 130 may be the same as the number of pixels in the image 132. Of course, in other illustrative examples, the set of predefined locations 130 may include only a portion of the pixels in the image 132.

The clutter reducer 114 identifies the location 134 selected in the image 132. The clutter reducer 114 then identifies a sub-image 136 in the image 132 at the location 134 selected. The sub-image 136 is a portion of the image 132. In these examples, the sub-image 136 may have a predefined size. In other words, a portion of the image 132 at the location 134 selected and having a predefined size is identified as the sub-image 136.

In one illustrative example, the sub-image 136 is identified as the portion of the image 132 having a predefined size and centered at the location 134 selected. In another illustrative example, the sub-image 136 is identified as the portion of the image 132 having a predefined size in which the leftmost and topmost pixel of the sub-image 136 is at the location 134 selected. Of course, in other illustrative examples, the sub-image 136 may be positioned relative to the location 134 selected in some other manner.

As depicted, the sub-image 136 includes sub-image pixels 140. The clutter reducer 114 identifies which of the sub-image pixels 140 are suspected target pixels 142 and which of the sub-image pixels 140 are clutter pixels 143. For example, the sub-image pixels 140 may include a number of suspected target pixels 142 centered at the location 134 selected and clutter pixels 143 around these suspected target pixels 142.

The number of suspected target pixels 142 may be one or more pixels in which the target object 112 in the scene 110 is expected to be captured in the sub-image 136. The clutter pixels 143 are pixels that are located around the suspected target pixels 142 in the sub-image 136. In one illustrative example, the suspected target pixels 142 are centered within the sub-image 136, while the clutter pixels 143 form a ring or border around the suspected target pixels 142.

The clutter reducer 114 may identify which of the sub-image pixels 140 are suspected target pixels 142 and which of the sub-image pixels 140 are clutter pixels 143 in a number of different ways. In some illustrative examples, the clutter reducer 114 may use a window 122 to identify the sub-image 136 at the location 134 selected and/or identify the suspected target pixels 142 and clutter pixels 143.

For example, without limitation, the window 122 may be an abstract or virtual window having a predefined size. The window 122 may be moved to the location 134 on the image 132 such that the window 122 overlaps a portion of the image 132 having a same size as the window 122. In this manner, the window 122 may be used as a mask for processing the image 132 for the different locations in the set of predefined locations 130. The portion of the image 132 overlapped by the window 122 is referred to as the sub-image 136.

The window 122 may include a suspected target region 124 and a clutter region 126. The suspected target region 124 is the portion of the window 122 in which a target image of a point object is expected to fit. For example, the suspected target region 124 may have a size in which a target image of the target object 112 in the scene 110 is expected to fit.

The target image of a point object, such as the target object 112 in the scene 110, is the portion of an image that represents the point object and a point spread function for the point object. As used herein, a "point spread function" is a model estimating the amount of blurring for any point object in an image over the exposure time for the image. The point spread function is the response of the sensor system 108 that generated the image to a point object. In other words, the point spread function estimates the amount of blur for a point object in an image. Of course, in other illustrative examples, the target image of a point object may include the point object without any blurring.

As depicted, the clutter region 126 of the window 122 surrounds the suspected target region 124. In one illustrative example, the window 122 may have the size of an 11 by 11 array of pixels. The suspected target region 124 may have the size of a 5 by 5 array of pixels centered within the window 122. The clutter region 126 may have the same size as the window 122 but without the suspected target region 124. In other words, the clutter region 126 may be a border around the suspected target region 124. The clutter region 126 may also be referred to as, for example, without limitation, a moat or a ring around the suspected target region 124.

The clutter region 126 has a size selected to encompass any clutter that may make the target object 112 more difficult to detect than desired. In some cases, this type of clutter surrounding the target object 112 may be referred to as "local clutter". The target object 112 that is surrounded by the clutter may be referred to as a "sub-clutter target object" in some cases.

When the clutter reducer 114 uses the window 122, the portion of the sub-image 136 overlapped by
the suspected target region 124 is identified as the suspected target pixels 142. The portion of the sub-image 136 overlapped by the clutter region 126 is identified as the clutter pixels 143.

In these illustrative examples, the clutter reducer 114 identifies sub-image pixel values 144 for the sub-image pixels 140. In these illustrative examples, a "pixel value" may be an intensity value, a brightness value, a color value, a grayscale value, or some other suitable type of value for a pixel in an image. A sub-image pixel value is a pixel value for a pixel in the sub-image 136.

A first portion 145 of the sub-image pixel values 144 correspond to the suspected target pixels 142, while a second portion 146 of the sub-image pixel values 144 correspond to the clutter pixels 143. In other words, the first portion 145 of the sub-image pixel values 144 are the pixel values for the suspected target pixels 142 and the second portion 146 of the sub-image pixel values 144 are the pixel values for the clutter pixels 143.

The clutter reducer 114 sends the second portion 146 of the sub-image pixel values 144 to the model manager 116. The model manager 116 is configured to fit a clutter model 147 to the second portion 146 of the sub-image pixel values 144. This clutter model 147 may be a model generated for use in reducing the clutter 120 in the images 106 generated by the sensor system 108 prior to processing of these images 106.

As used herein, the clutter model 147 may comprise at least one of an equation, a mathematical function, an algorithm, program code, a mathematical formula, a mathematical expression, a mathematical transform, and some other suitable type of system that uses mathematical concepts and/or language. Further, the output of the clutter model 147 may be a waveform.

This waveform may be, for example, a three-dimensional waveform described with respect to a first axis, a second axis, and a third axis. The first axis may represent a row pixel location for the sub-image 136, the second axis may represent a column pixel location for the sub-image 136, and the third axis may represent a pixel value. In some cases, waveform may be referred to as a wavelet.

In one illustrative example, the clutter model 147 takes the form of a polynomial equation of the $n^{th}$ degree. The solution of this polynomial equation is a three-dimensional waveform from which a pixel value for each pixel of the sub-image pixels 140 in the sub-image 136 may be identified. In other words, at least a portion of the points along the three-dimensional waveform correspond to the sub-image pixel values 144 for the sub-image pixels 140 in the sub-image 136.

The model manager 116 is configured to fit the clutter model 147 to the second portion 146 of the sub-image pixel values 144 to form a fitted clutter model 155. In particular, the model manager 116 is configured to adjust parameters 148 for the clutter model 147 such that clutter model 147 best fits the second portion 146 of the sub-image pixel values 144.

In other words, the model manager 116 identifies the values for these parameters 148 that cause the waveform produced by the clutter model 147 to include points corresponding to the clutter pixels 143 that substantially match or best fit the second portion 146 of the sub-image pixel values 144. Using only the second portion 146 of the sub-image pixel values 144 corresponding to the clutter pixels 143 and not the first portion 145 of the sub-image pixels 140 corresponding to the suspected target pixels 142 may reduce the possibility that the target object 112 is represented in the clutter model 147.

In one illustrative example, the parameters 148 for the clutter model 147 include a first number of parameters 150, a second number of parameters 152, and a third number of parameters 154. As one specific example, the first number of parameters 150 may be for a pedestal-type function 156. The second number of parameters 152 may be for a ramp-type function 158. The third number of parameters 154 may be for a parabolic-type function 160. In this manner, with these parameters 148, the second portion 146 of the sub-image pixel values 144 may be fitted to a clutter model 147 having at least one of a pedestal-type, ramp-type, and parabolic-type shape. In some cases, the clutter model 147 may be referred to as a model for a parabolic curved ramp waveform.

The model manager 116 sends the fitted clutter model 155 to the clutter reducer 114. The clutter reducer 114 is configured to use the fitted clutter model 155 to generate modeled pixel values 162. For example, without limitation, a modeled pixel value may be generated for each of the sub-image pixels 140. Of course, in other illustrative examples, the model manager 116 may be configured to use the fitted clutter model 155 to generate the modeled pixel values 162 and send the modeled pixel values 162 to the clutter reducer 114.

The clutter reducer 114 then subtracts the modeled pixel values 162 from the sub-image pixel values 144 for the sub-image 136 to form new pixel values 164. A new pixel value may be generated for each of the sub-image pixels 140. In these illustrative examples, the clutter reducer 114 then replaces the sub-image pixel values 144 with the new pixel values 164 to form a modified sub-image 165.

The clutter 120 in the modified sub-image 165 is reduced relative to the sub-image 136. In particular, the new pixel values 164 for the sub-image pixels 140 of the modified sub-image 165 may represent a reduction in clutter 120 for the sub-image 136 to within selected tolerances. The modified sub-image 165 may now be included as part of the image 132 with respect to further processing of the image 132.

For example, after the modified sub-image 165 has been formed, a next location may be selected from the set of predefined locations 130 for processing the image 132. A new sub-image may be identified in the image 132 at this next location. The new sub-image may or may not include pixels that are part of the modified sub-image 165. This new sub-image may be processed in a manner similar to the manner in which the sub-image 136 was processed to form the modified sub-image 136.

Further, this process may be repeated for each location in set of predefined locations 130 to form a modified image 168. The clutter 120 in the modified image 168 is reduced relative to the clutter 120 in the image 132 generated by the sensor system 108. The overall process for processing the image 132 generated by the sensor system 108 to form the modified image 168 may be performed for each of the images 106 generated by the sensor system 108 to form a number of modified images 166. The overall clutter 120 in the number of modified images 166 is reduced relative to the number of images 106 generated by the sensor system 108.

The object detector 118 in the image processing system 102 may use these modified images 166 to detect the presence of target objects in the scene 110 captured by the modified images 166. In one illustrative example, the object detector 118 receives each of the modified images 166 after each modified image is formed by the clutter reducer 114. In another illustrative example, the object detector 118 receives all of the modified images 166 at the same time.

When the target object 112 is captured in a modified image 168, the new pixel values in that modified image 168 indicate the presence of the target object 112 with reduced clutter around the target object 112. When the target object 112 is not captured in the modified image 168, the new pixel values in the modified image 168 represent noise contributed by the sensor system 108.

As depicted, the object detector 118 may use a selected threshold 170 to detect the presence of target objects in the scene 110. For example, any pixels in a modified image 168 having a pixel value greater than the selected threshold 170 may be considered as representing a target object. When two pixels adjacent to each other both have pixel values greater than the selected threshold 170, both pixels may represent the same target object or two different target objects. Further processing may be needed to make this distinction.

The selected threshold 170 may be selected in a number of different ways. In one illustrative example, the selected threshold 170 may be selected using a database of thresholds for different types of target objects. In another illustrative example, the selected threshold 170 may be selected based on a histogram of the pixel values for the pixels in the modified image. Of course, in other illustrative examples, the selected threshold 170 may be selected in some other suitable manner.

In this manner, the different illustrative embodiments provide an image processing system 102 that may be used to reduce clutter 120 that changes with respect to space and time in a number of images 106. In particular, by fitting a clutter model 147 to the pixel values corresponding to clutter pixels in the different sub-images identified in an image at different locations, the values for the parameters 148 for the clutter model 147 are changed to adapt to the changes in the clutter 120 in an image over the different locations in the image and changes in the clutter 120 between different images in the images 106.

The illustration of the image processing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, the clutter reducer 114 and the model manager 116 may be part of the same module within the image processing system 102. In some illustrative examples, at least one of the clutter reducer 114, the model manager 116, and the object detector 118 may be implemented within a processor unit in the sensor system 108.

In other illustrative examples, the sensor system 108 may be configured to generate raw image data and send this raw image data to the image processing system 102. The image processing system 102 may then use this raw image data to form the images 106.

Figure 2:
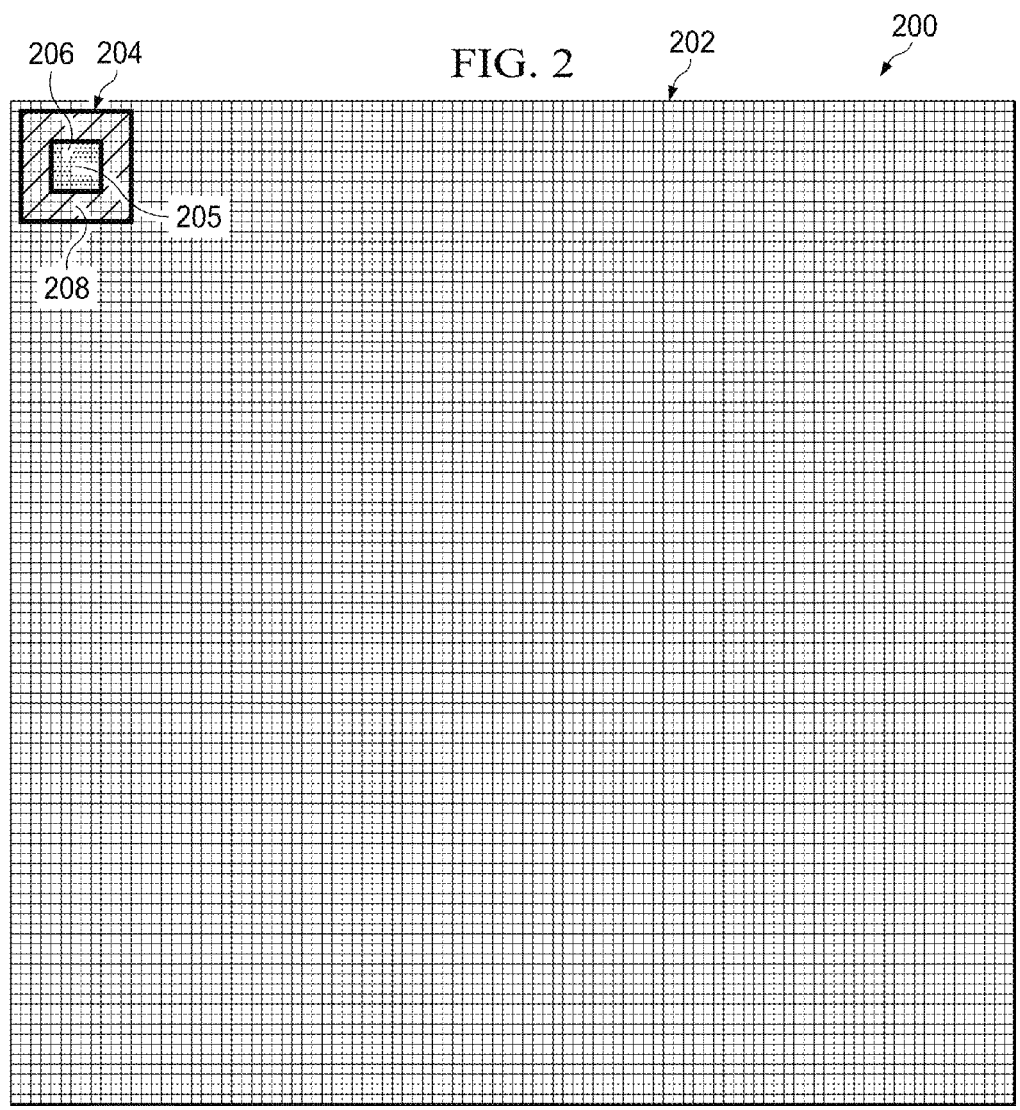
FIG. 2 is an illustration of a window moving over an image in accordance with an illustrative embodiment.

With reference now to FIG. 2, an illustration of a sub-image in an image is depicted in accordance with an illustrative embodiment. The image 200 depicted in FIG. 2 is an example of one implementation for the image 132 described in FIG. 1. As depicted, the image 200 comprises an array of pixels 202. In this illustrative example, the array of pixels 202 comprises 100 columns of pixels and 100 rows of pixels. In other words, the array of pixels 202 is a 100 pixel by 100 pixel array of pixels.

In this illustrative example, a sub-image 204 has been identified in the image 200. This sub-image 204 may be an example of one implementation for the sub-image 136 described in FIG. 1. This sub-image 204 may have been identified as the portion of the image 200 overlapped by a window (not shown), such as the window 122 described in FIG. 1, centered at location 205.

As depicted, the sub-image 204 includes suspected target pixels 206 and clutter pixels 208 that make up the sub-image pixels in the sub-image 204. In this illustrative example, the sub-image 204 is an 11 pixel by 11 pixel sub-image. The suspected target pixels 206 are the sub-image pixels within a 5 pixel by 5 pixel region centered at the location 205.

Further, the clutter pixels 208 are the sub-image pixels that surround the suspected target pixels 206. In this illustrative example, the clutter pixels 208 are the sub-image pixels that are within a 96 pixel region that surrounds the suspected target pixels 206. In particular, the clutter pixels 208 are the portion of the sub-image pixels in the sub-image 204 that are not suspected target pixels 206.

Figure 3:
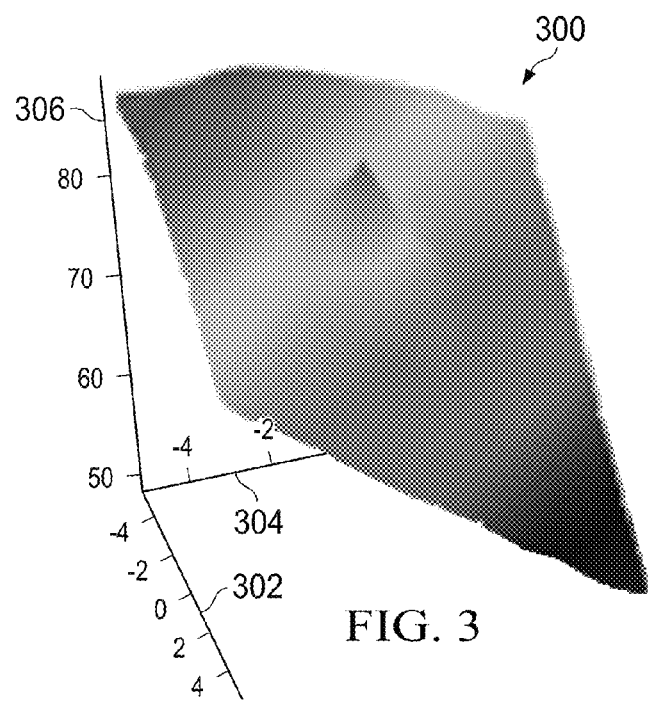
FIG. 3 is an illustration of image data in accordance with an illustrative embodiment.

With reference now to FIG. 3, an illustration of image data is depicted in accordance with an illustrative embodiment. In this illustrative example, image data 300 for the sub-image 136 in the image 132 described in FIG. 1 is depicted. In particular, this image data 300 is for the sub-image 136 before the sub-image 136 has been processed to reduce clutter in the sub-image 136.

Further, as depicted, this image data 300 is shown with respect to a first axis 302, a second axis 304, and a third axis 306. The first axis 302 represents a row pixel location in the sub-image 136. The second axis 304 represents a column pixel location in the sub-image 136. The third axis 306 represents pixel values.

In this illustrative example, the image data 300 comprises the sub-image pixel values 144 for the sub-image pixels 140 in the sub-image 136 in FIG. 1. In particular, the target object 112 in the scene 110 in FIG. 1 has been captured in the sub-image 136. The image data 300 may be processed as described in FIG. 1.

Figure 4:
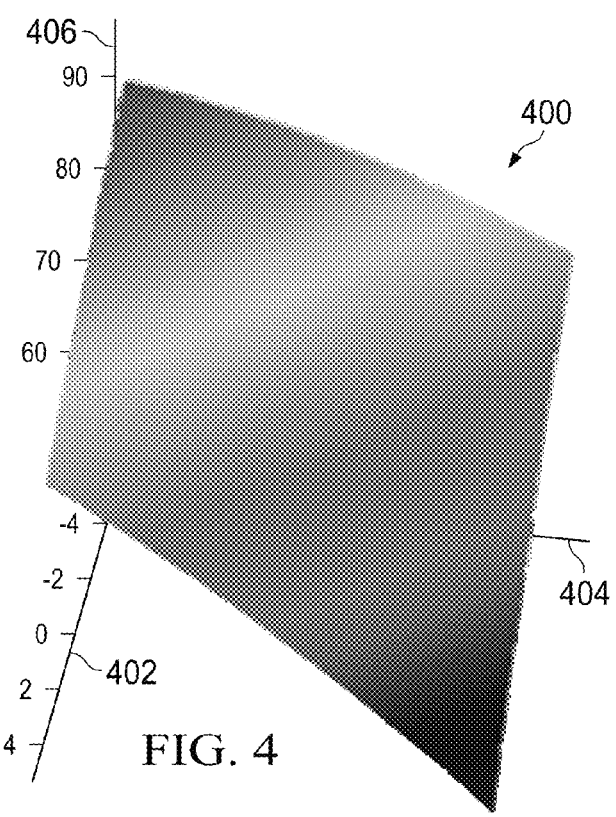
FIG. 4 is an illustration of modeled image data in accordance with an illustrative embodiment.

Turning now to FIG. 4, an illustration of modeled image data is depicted in accordance with an illustrative embodiment. In this illustrative example, modeled image data 400 generated using, for example, the fitted clutter model 155 described in FIG. 1, is depicted.

This modeled image data 400 is shown with respect to a first axis 402, a second axis 404, and a third axis 406. The first axis 402 represents a row pixel location in the sub-image 136 in FIG. 1. The second axis 404 represents a column pixel location in the sub-image 136. The third axis 406 represents, for example, modeled pixel values 162 generated using the fitted clutter model 155 in FIG. 1.

In particular, values for the parameters 148 for the clutter model 147 in FIG. 1 are changed using the portion of the image data 300 in FIG. 3 corresponding to the clutter pixels 143 in the sub-image 136 to form the fitted clutter model 155. The modeled image data 400 is generated using this fitted clutter model 155 and includes the modeled pixel values 162 for the sub-image 136. In this illustrative example, the modeled image data 400 takes the form of a parabolic curved ramp waveform.

Figure 5:
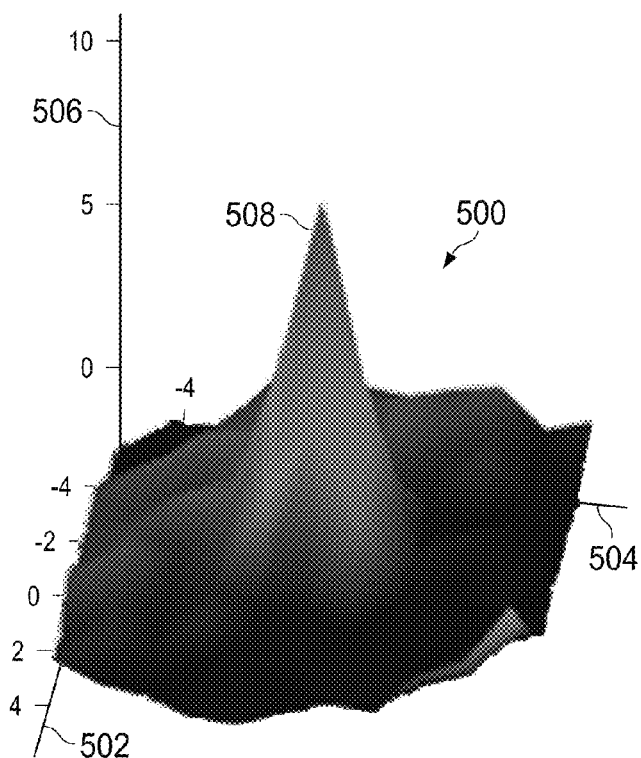
FIG. 5 is an illustration of new image data in accordance with an illustrative embodiment.

Turning now to FIG. 5, an illustration of new image data is depicted in accordance with an illustrative embodiment. In this illustrative example, new image data 500 is generated by subtracting the modeled image data 400 in FIG. 4 from the image data 300 in FIG. 3. The new image data 500 comprises, for example, the new pixel values 164 for the sub-image 136 described in FIG. 1.

This new image data 500 is shown with respect to a first axis 502, a second axis 504, and a third axis 506. The first axis 502 represents a row pixel location in the sub-image 136. The second axis 504 represents a column pixel location in the sub-image 136. The third axis 506 represents the new pixel values 164 used to form the modified sub-image 165 in FIG. 1. The new image data 500 represents a reduction of clutter relative to the image data 300 in FIG. 3. As depicted, with this reduction of clutter in the sub-image 136, a peak 508 is formed. This peak 508 indicates the presence of the target object 112 in the scene 110 in FIG. 1. In this manner, the presence of the target object 112 may be more clearly identified using the new image data 500 as compared to the image data 300 in FIG. 3.

Figure 6:
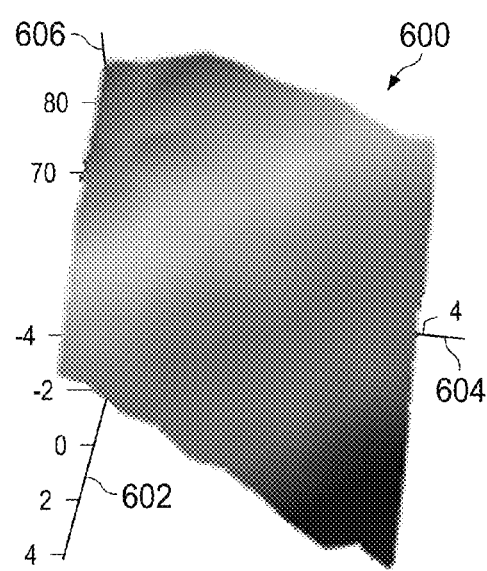
FIG. 6 is an illustration of image data in accordance with an illustrative embodiment.

With reference now to FIG. 6, an illustration of image data is depicted in accordance with an illustrative embodiment. In this illustrative example, image data 600 for the sub-image 136 in the image 132 described in FIG. 1 is depicted. In particular, this image data 600 is for the sub-image 136 before the sub-image 136 has been processed to reduce clutter in the sub-image 136.

This image data 600 is shown with respect to a first axis 602, a second axis 604, and a third axis 606. The first axis 602 represents a row pixel location in the sub-image 136. The second axis 604 represents a column pixel location in the sub-image 136. The third axis 606 represents pixel values for the sub-image 136.

In particular, the image data 600 comprises the sub-image pixel values 144 for the sub-image pixels 140 in the sub-image 136 in FIG. 1. In this illustrative example, the target object 112 in the scene 110 has not been captured in the sub-image 136. The image data 600 may be processed as described in FIG. 1.

Figure 7:
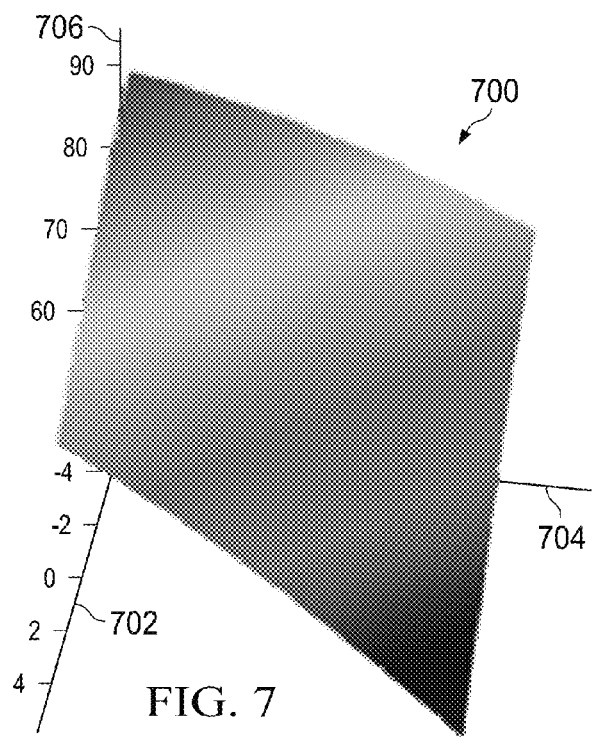
FIG. 7 is an illustration of modeled image data in accordance with an illustrative embodiment.

Turning now to FIG. 7, an illustration of modeled image data is depicted in accordance with an illustrative embodiment. In this illustrative example, modeled image data 700 generated using, for example, the clutter model 147 described in FIG. 1 is depicted.

This modeled image data 700 is shown with respect to a first axis 702, a second axis 704, and a third axis 706. The first axis 702 represents a row pixel location in the sub-image 136 in FIG. 1. The second axis 704 represents a column pixel location in the sub-image 136. The third axis 706 represents modeled pixel values 162 for the sub-image 136.

In this illustrative example, the modeled image data 700 comprises the modeled pixel values 162 generated using the fitted clutter model 155 in FIG. 1. In particular, values for the parameters 148 for the clutter model 147 in FIG. 1 are changed using the portion of the image data 600 in FIG. 6 corresponding to the clutter pixels 143 in the sub-image 136 to form the fitted clutter model 155. The modeled image data 700 is generated using this fitted clutter model 155 and includes the modeled pixel values 162 for the sub-image 136. In this illustrative example, the modeled image data 700 takes the form of a parabolic curved ramp waveform.

Figure 8:
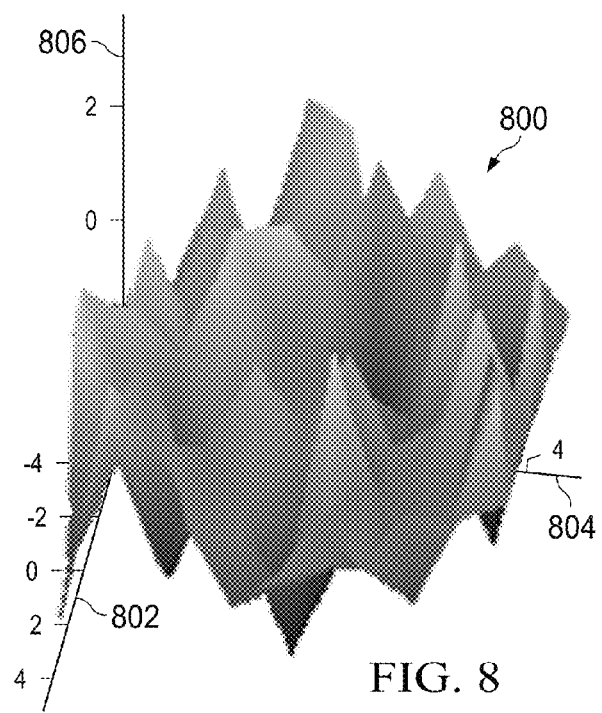
FIG. 8 is an illustration of new image data in accordance with an illustrative embodiment.

Turning now to FIG. 8, an illustration of new image data is depicted in accordance with an illustrative embodiment. In this illustrative example, new image data 800 is generated by subtracting the modeled image data 700 in FIG. 7 from the image data 600 in FIG. 6. The new image data 800 comprises, for example, the new pixel values 164 for the sub-image 136 in the image 132 described in FIG. 1.

This new image data 800 is shown with respect to a first axis 802, a second axis 804, and a third axis 806. The first axis 802 represents a row pixel location in the sub-image 136. The second axis 804 represents a column pixel location in the sub-image 136. The third axis 806 represents the new pixel values 164 used to form the modified sub-image 165 in FIG. 1.

The new image data 800 represents a reduction of clutter relative to the image data 600 in FIG. 6. As depicted, with this reduction of clutter in the sub-image 136, the new image data 800 represents noise contributed by the sensor system 108 that generated the image 132 in FIG. 1.

The illustrations of the image data 300 in FIG. 3, the modeled image data 400 in FIG. 4, the new image data 500 in FIG. 5, the image data 600 in FIG. 6, the modeled image data 700 in FIG. 7, and the new image data 800 in FIG. 8 are not meant to imply limitations to the manner in which an illustrative embodiment may be implemented. Different types of image data may take different forms, depending on the implementation.

Figure 9:
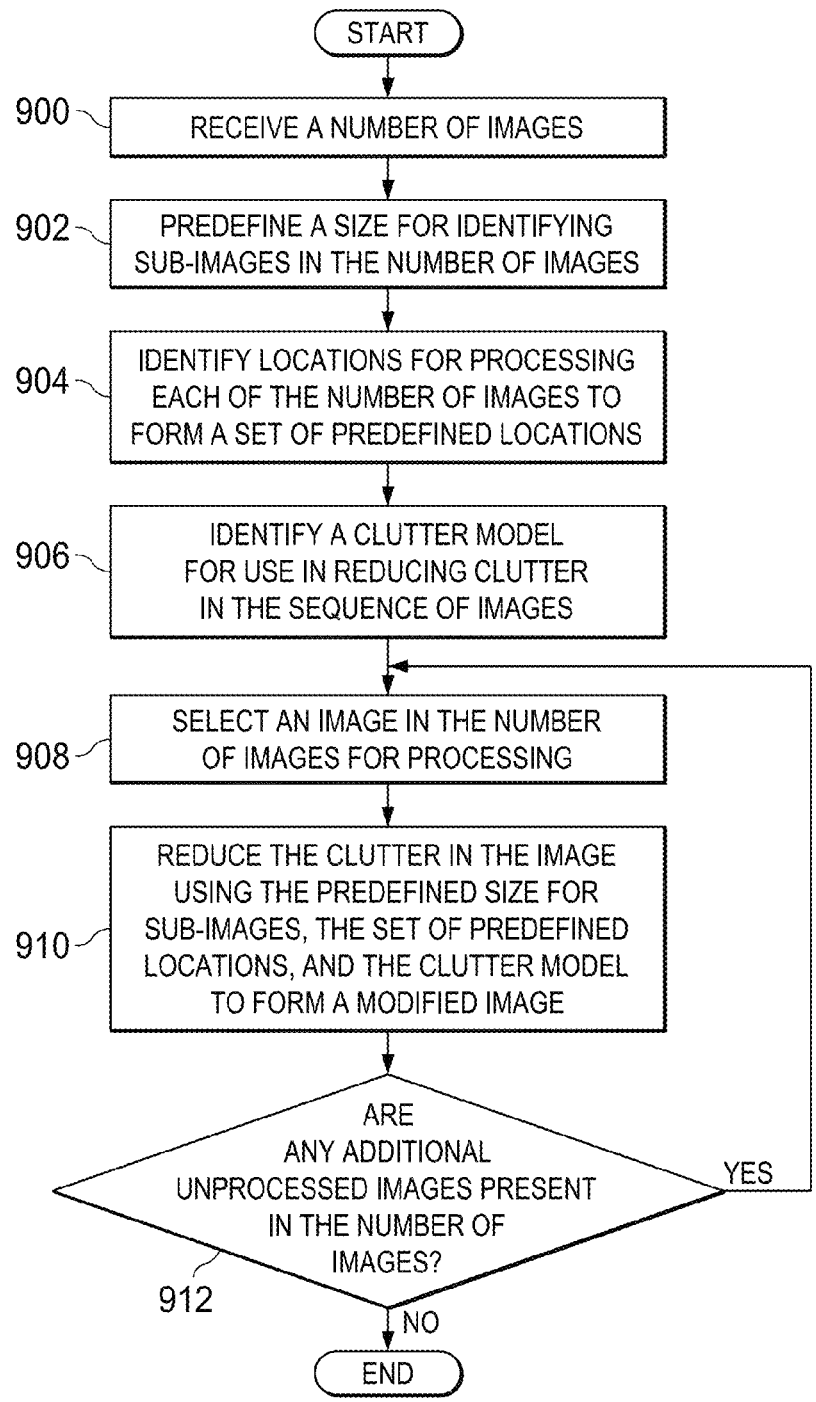
FIG. 9 is an illustration of a process for reducing clutter in a number of images in the form of a flowchart in accordance with an illustrative embodiment.

With reference now to FIG. 9, an illustration of a process for reducing clutter in a number of images in the form of a flowchart is depicted in accordance with an illustrative embodiment. The process illustrated in FIG. 9 may be implemented using, for example, without limitation, the image processing system 102 described in FIG. 1. In one illustrative example, the process illustrated in FIG. 9 may be implemented using the clutter reducer 114 and the model manager 116 described in FIG. 1.

The process begins by receiving a number of images (operation 900). The number of images may be received from a sensor system, such as the sensor system 108 described in FIG. 1. The process then predefines a size for identifying sub-images in the number of images (operation 902).

The process then identifies locations for processing each of the number of images to form a set of predefined locations (operation 904). Each location is a pixel location that corresponds to a particular pixel in an image. In this illustrative example, the set of predefined locations identified are the same for each of the number of images.

Next, the process identifies a clutter model for use in reducing clutter in the number of the images (operation 906). The clutter model has parameters in which values for these parameters may be changed from image to image. Further, these parameters may be changed during the processing of a particular image. In one illustrative example, the clutter model takes the form of a polynomial equation in which the parameters for the clutter model are unknown variables in the polynomial equation.

Thereafter, the process selects an image in the number of images for processing (operation 908). The process reduces the clutter in the image using the predefined size for sub-images, the set of predefined locations, and the clutter model to form a modified image (operation 910).

The process then determines whether any additional unprocessed images are present in the number of images (operation 912). If additional unprocessed images are present in the number of images, the process returns to the operation 908 as described above. Otherwise, the process terminates. In some cases, the process may send the modified image formed in the operation 910 to an object detector, such as the object detector 118 described in FIG. 1. For example, the modified image may be sent to the object detector during the operation 910, after the operation 910, or prior to terminating after the operation 912.

Figure 10:
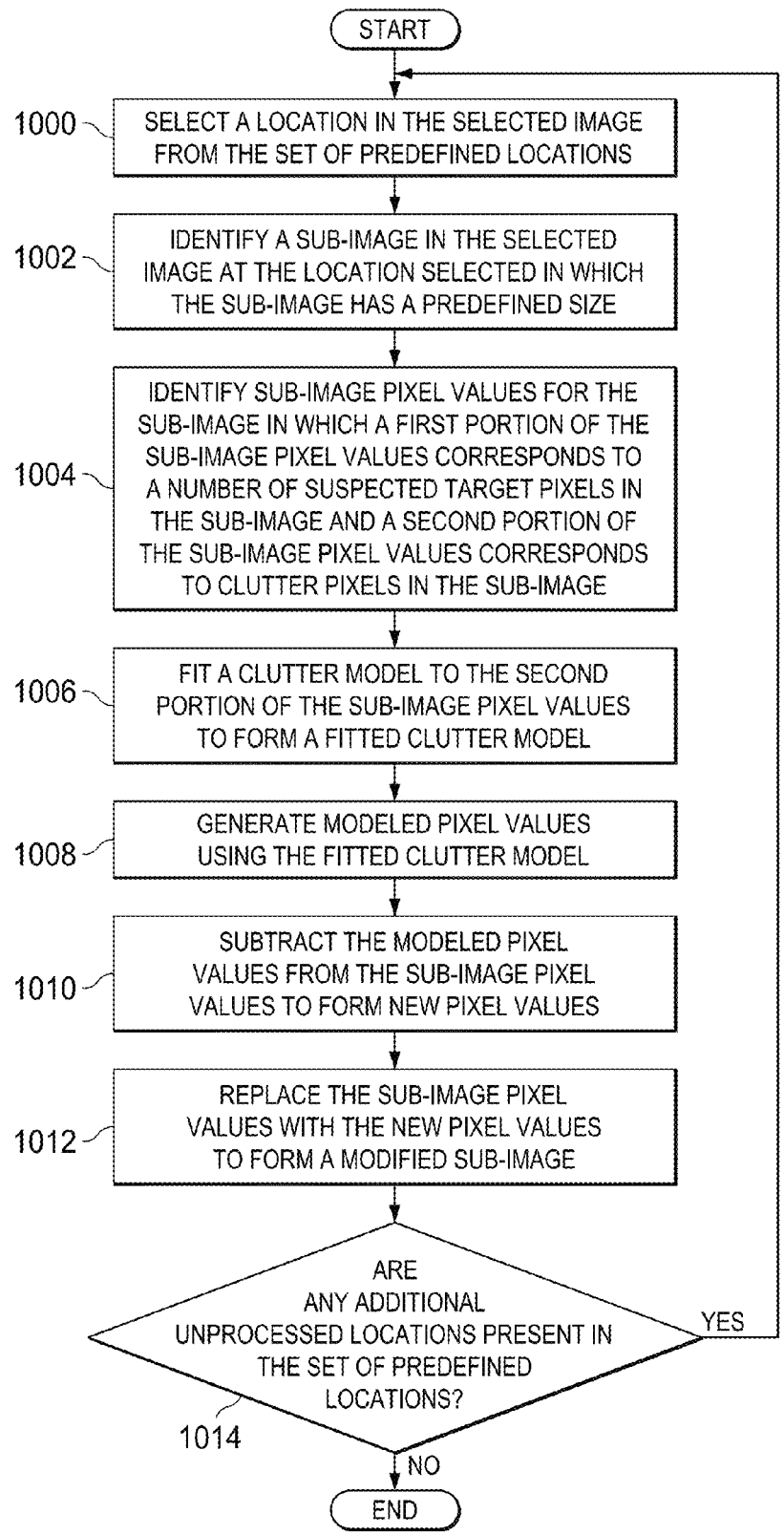
FIG. 10 is an illustration of a process for reducing clutter in an image in the form of a flowchart in accordance with an illustrative embodiment.

With reference now to FIG. 10, an illustration of a process for reducing clutter in an image in the form of a flowchart is depicted in accordance with an illustrative embodiment. The process illustrated in FIG. 10 may be used to implement the operation 910 in FIG. 9.

The process selects a location in the selected image from the set of predefined locations (operation 1000). The selected image is the image selected in the operation 908 in FIG. 9. The set of predefined locations is the set of predefined locations identified in the operation 904 in FIG. 9.

The process then identifies a sub-image in the selected image at the location selected in which the sub-image has a predefined size (operation 1002). The predefined size for the sub-image may be the size identified in the operation 902 in FIG. 9.

Thereafter, the process identifies sub-image pixel values for the sub-image in which a first portion of the sub-image pixel values corresponds to a number of suspected target pixels in the sub-image and a second portion of the sub-image pixel values corresponds to clutter pixels in the sub-image (operation 1004). In this illustrative example, the number of suspected target pixels may be one or more pixels in the sub-image centered at the location selected and the clutter pixels may be the pixels in the sub-image that surround the number of suspected target pixels.

Next, the process fits a clutter model to the second portion of the sub-image pixel values to form a fitted clutter model (operation 1006). For example, the clutter model may be given by the following equation:

$$fitn_{i,j} = aoutn + boutn \cdot i + coutn \cdot j + doutn \cdot i^2 + eoutn \cdot j^2 + foutn \cdot i \cdot j,$$

where $fitn_{i,j}$ is a modeled pixel value for an $n^{th}$ pixel in a sub-image, n is the $n^{th}$ pixel in the sub-image, i is the row location of the $n^{th}$ pixel, j is the column location of the $n^{th}$ pixel, and aoutn, boutn, coutn, doutn, eoutn, and foutn are the parameters for the clutter model. In particular, aoutn is for a pedestal-type function; boutn and coutn are for a ramp-type function, and doutn, eoutn, and foutn are for a parabolic-type function.

In the operation 1006, values for aoutn, boutn, coutn, doutn, eoutn, and foutn are identified using the second portion of the sub-image pixel values corresponding to clutter pixels in the sub-image. The values for these parameters may be identified using, for example, without limitation, matrices.

Thereafter, the process generates modeled pixel values using the fitted clutter model (operation 1008). In other words, the process generates modeled pixel values using the clutter model fitted to the second portion of the sub-image pixel values identified in operation 1004. In the operation 1008, the process identifies a modeled pixel value for each pixel in the sub-image using the fitted clutter model.

The process then subtracts the modeled pixel values from the sub-image pixel values to form new pixel values (operation 1010). In particular, the operation 1010 uses the following equation to form the new pixel values:

$$targn_{i,j} = dn_{i,j} - fitn_{i,j},$$

where $targn_{i,j}$ is a new pixel value for an $n^{th}$ pixel in the sub-image, and $dn_{i,j}$ is the sub-image pixel value for the $n^{th}$ pixel in the sub-image.

Next, the process replaces the sub-image pixel values with the new pixel values to form a modified sub-image (operation 1012). Thereafter, the process determines whether any additional unprocessed locations are present in the set of predefined locations (operation 1014). If additional unprocessed locations are present, the process returns to operation 1000 as described above. Otherwise, the process terminates.

When the process terminates, processing of the image is complete, and the result is a modified image in which some or all of the pixels in the image have new pixel values. These new pixel values represent a reduction in clutter in the modified image relative to the original selected image.

Figure 11:
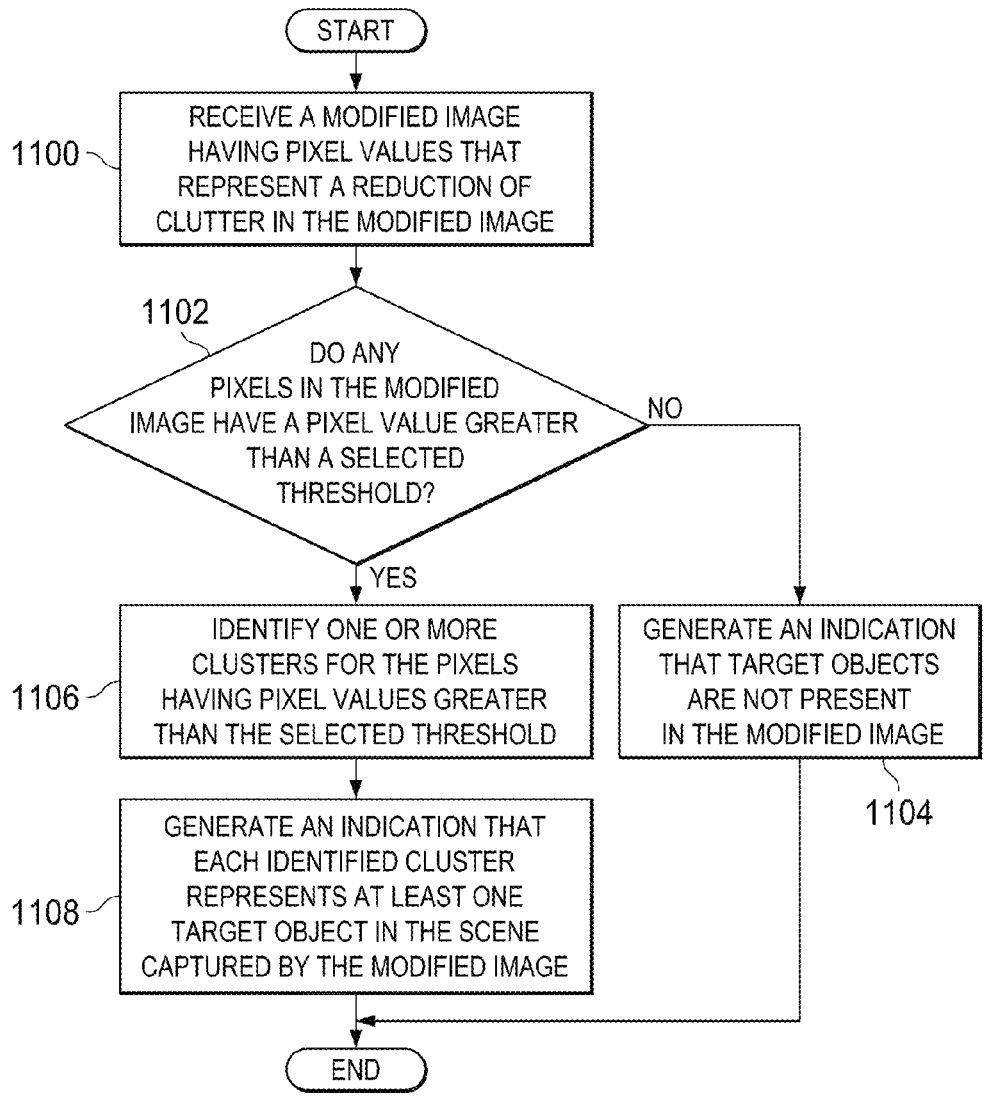
FIG. 11 is an illustration of a process for detecting one or more target objects in a modified image in accordance with an illustrative embodiment.

With reference now to FIG. 11, an illustration of a process for detecting one or more target objects in a modified image is depicted in accordance with an illustrative embodiment. The process illustrated in FIG. 11 may be implemented using the image processing system 102 described in FIG. 1. In one illustrative example, this process may be implemented using the object detector 118 described in FIG. 1.

The process begins by receiving a modified image having pixel values that represent a reduction of clutter in the modified image (operation 1100). This modified image may be, for example, the modified image formed in the operation 910 in FIG. 9. Further, this modified image may be the modified image formed using the process described in FIG. 10.

The process determines whether any pixels in the modified image have a pixel value greater than a selected threshold (operation 1102). If no pixels in the modified image have a pixel value greater than the selected threshold, the process generates an indication that target objects are not present in the modified image (operation 1104), with the process terminating thereafter.

Otherwise, if any of the pixels in the modified image have a pixel value greater than a selected threshold, the process identifies one or more clusters for the pixels having pixel values greater than the selected threshold (operation 1106). In this illustrative example, a cluster is one or more pixels having a pixel value greater than the selected threshold. When more than one pixel is present in the cluster, these pixels are adjacent to each other without any pixels having a pixel value less than the selected threshold in between the pixels in the cluster.

The process then generates an indication that each identified cluster represents at least one target object in the scene captured by the modified image (operation 1108), with the process terminating thereafter. In some cases, a cluster may represent one target object. In other illustrative examples, a cluster may represent two or more target objects. Resolving this cluster may be performed using currently available algorithms for resolving clusters of pixels. As used herein, "resolving" a cluster means distinguishing between the different target objects represented by the cluster.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

With reference now to FIG. 12, an illustration of matrices configured for use in identifying values for parameters for a clutter model is depicted in accordance with an illustrative embodiment. As depicted, a first matrix 1200 multiplied by a second matrix 1202 results in a third matrix 1204. The first matrix 1200 is a six by six clutter coefficient matrix with elements based on a calculus of variations process that results in six simultaneous linear equations with six unknowns.

The elements of the first matrix 1200 represent the multiplicative coefficients of the six unknowns in these six equations. The six simultaneous equations are formed by minimizing the sum of squared residuals (SOS) between the original pixel values for the image and the new pixel values for the image generated based on the clutter model. This minimization process involves setting the result of the partial derivatives of the sum of squared residuals with respect to each of the parameters for the clutter model to zero and then expressing the six simultaneous linear equations with the six unknowns in a matrix formulation.

The second matrix 1202 is a matrix with the parameters that are unknown in the clutter model. The third matrix 1204 is a matrix with elements based on the portion of sub-image pixel values for a sub-image corresponding to clutter pixels in the sub-image. By identifying the values for the elements of the first matrix 1200 and the third matrix 1204, the values for the elements of the second matrix 1202 may be identified.

With reference now to FIG. 13, an illustration of matrices having elements for which values have been identified is depicted in accordance with an illustrative embodiment. In FIG. 13, an example of one solution for the second matrix 1202 based on values for the elements in the first matrix 1200 and the elements in the third matrix 1204 is depicted.

With reference now to FIG. 14, an illustration of a data processing system is depicted in accordance with an illustrative embodiment. In this illustrative example, a data processing system 1400 may be used to implement one or more computers in the computer system 104 in FIG. 1. In this illustrative example, the data processing system 1400 includes a communications framework 1402, which provides communications between a processor unit 1404, a memory 1406, persistent storage 1408, a communications unit 1410, an input/output (I/O) unit 1412, and a display 1414.

The processor unit 1404 serves to execute instructions for software that may be loaded into the memory 1406. The processor unit 1404 may be a number of processors, a multi-processor core, or some other type of processor, depending on the particular implementation. Further, the processor unit 1404 may be implemented using a number of heterogeneous processor systems in which a main processor is present with secondary processors on a single chip. As another illustrative example, the processor unit 1404 may be a symmetric multi-processor system containing multiple processors of the same type.

The memory 1406 and the persistent storage 1408 are examples of storage devices 1416. A storage device is any piece of hardware that is capable of storing information, such as, for example, without limitation, data, program code in functional form, and/or other suitable information either on a temporary basis and/or a permanent basis. The storage devices 1416 also may be referred to as computer readable storage devices in these examples. The memory 1406, in these examples, may be, for example, a random access memory or any other suitable volatile or non-volatile storage device. The persistent storage 1408 may take various forms, depending on the particular implementation.

The persistent storage 1408 may contain one or more components or devices. For example, the persistent storage 1408 may include a hard drive, a flash memory, a rewritable optical disk, a rewritable magnetic tape, or some combination of the above. The media used by the persistent storage 1408 also may be removable. For example, a removable hard drive may be used for the persistent storage 1408.

The communications unit 1410, in these examples, provides for communications with other data processing systems or devices. In these examples, the communications unit 1410 is a network interface card. The communications unit 1410 may provide communications through the use of either or both physical and wireless communications links.

The input/output unit 1412 allows for input and output of data with other devices that may be connected to the data processing system 1400. For example, the input/output unit 1412 may provide a connection for user input through a keyboard, a mouse, and/or some other suitable input device. Further, the input/output unit 1412 may send output to a printer. The display 1414 provides a mechanism to display information to a user.

Instructions for the operating system, applications, and/or programs may be located in the storage devices 1416, which are in communication with the processor unit 1404 through the communications framework 1402. In these illustrative examples, the instructions are in a functional form on the persistent storage 1408. These instructions may be loaded into the memory 1406 for execution by the processor unit 1404. The processes of the different illustrative embodiments may be performed by the processor unit 1404 using computer-implemented instructions, which may be located in a memory, such as the memory 1406.

These instructions are referred to as program code, computer usable program code, or computer readable program code that may be read and executed by a processor in the processor unit 1404. The program code in the different embodiments may be embodied on different physical or computer readable storage media, such as the memory 1406 or the persistent storage 1408.

Program code 1418 is located in a functional form on computer readable media 1420 that is selectively removable and may be loaded onto or transferred to the data processing system 1400 for execution by the processor unit 1404. The program code 1418 and the computer readable media 1420 form a computer program product 1422 in these illustrative examples. In one example, the computer readable media 1420 may be computer readable storage media 1424 or computer readable signal media 1426.

The computer readable storage media 1424 may include, for example, an optical or magnetic disk that is inserted or placed into a drive or other device that is part of the persistent storage 1408 for transfer onto a storage device, such as a hard drive, that is part of the persistent storage 1408. The computer readable storage media 1424 also may take the form of a persistent storage, such as a hard drive, a thumb drive, or a flash memory, that is connected to the data processing system 1400.

In these examples, the computer readable storage media 1424 is a physical or tangible storage device used to store the program code 1418 rather than a medium that propagates or transmits the program code 1418. The computer readable storage media 1424 is also referred to as a computer readable tangible storage device or a computer readable physical storage device. In other words, the computer readable storage media 1424 is a media that can be touched by a person.

Alternatively, the program code 1418 may be transferred to the data processing system 1400 using the computer readable signal media 1426. The computer readable signal media 1426 may be, for example, a propagated data signal containing the program code 1418. For example, the computer readable signal media 1426 may be an electromagnetic signal, an optical signal, and/or any other suitable type of signal. These signals may be transmitted over a communications link, such as a wireless communications links, an optical fiber cable, a coaxial cable, a wire, and/or any other suitable type of communications link. In other words, the communications link and/or the connection may be physical or wireless in the illustrative examples.

In some illustrative embodiments, the program code 1418 may be downloaded over a network to the persistent storage 1408 from another device or data processing system through the computer readable signal media 1426 for use within the data processing system 1400. For instance, program code stored in a computer readable storage medium in a server data processing system may be downloaded over a network from the server to the data processing system 1400. The computer readable storage medium may be a nontransitory computer readable storage medium. The data processing system providing the program code 1418 may be a server computer, a client computer, or some other device capable of storing and transmitting the program code 1418.

The different components illustrated for the data processing system 1400 are not meant to provide architectural limitations to the manner in which different embodiments may be implemented. The different illustrative embodiments may be implemented in a data processing system including components in addition to or in place of those illustrated for the data processing system 1400. Other components shown in FIG. 14 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, the processor unit 1404 may take the form of a hardware unit that has circuits that are manufactured or configured for a particular use. This type of hardware may perform operations without needing program code to be loaded into a memory from a storage device to be configured to perform the operations.

For example, when the processor unit 1404 takes the form of a hardware unit, the processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, the program code 1418 may be omitted, because the processes for the different embodiments are implemented in a hardware unit.

In still another illustrative example, the processor unit 1404 may be implemented using a combination of processors found in computers and hardware units. The processor unit 1404 may have a number of hardware units and a number of processors that are configured to run the program code 1418. With this depicted example, some of the processes may be implemented in the number of hardware units, while other processes may be implemented in the number of processors.

In another example, a bus system may be used to implement the communications framework 1402 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, the memory 1406, or a cache, such as found in an interface and memory controller hub that may be present in the communications framework 1402.

Thus, the different illustrative embodiments provide a method and apparatus for processing a number of images, such as the number of images 106 described in FIG. 1, to reduce clutter 120 in these number of images 106. In one illustrative example, a method for reducing the clutter 120 in a particular image 132 begins by identifying a sub-image 136 at a location 134 selected from a set of predefined locations 130. Identifying the sub-image 136 may include identifying a number of suspected target pixels 142 in the sub-image 136 and clutter pixels 143 around these suspected target pixels 142.

Sub-image pixel values 144 for the sub-image 136 are identified in which a first portion 145 of the sub-image pixel values 144 correspond to the suspected target pixels 142 and a second portion 146 of the sub-image pixel values 144 correspond to the clutter pixels 143.

Modeled pixel values 162 are generated using a fitted clutter model 155 formed by fitting a clutter model 147 to the second portion 146 of the sub-image pixel values 144. The modeled pixel values 162 are subtracted from the sub-image pixel values 144 to form new pixel values 164. The new pixel values 164 represent a reduction in clutter 120 relative to the sub-image pixel values 144. The sub-image pixel values 144 are replaced with the new pixel values 164 to form a modified sub-image 165 in which the clutter 120 in the modified sub-image 165 is reduced relative to the sub-image 136.

These steps may be repeated for the sub-image identified at each location in the set of predefined locations 130. Further, this entire process may be performed for each image in the number of images 106 generated by and received from the sensor system 108. In this manner, the clutter 120 in the number of images 106 may be reduced to within selected tolerances using the different illustrative embodiments.

For example, using the clutter reducer 114, the model manager 116, and the object detector 118 described in FIG. 1, the clutter 120 in these images 106 may be reduced such that one or more target objects, such as the target object 112 in FIG. 1, may be detected with a desired level of accuracy. The different illustrative embodiments allow these one or more target objects to be detected without requiring more processing resources and/or time than desired.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reducing clutter in a number of images, the method comprising:
  identifying sub-image pixel values for a sub-image at a location in an image in the number of images, wherein a first portion of the sub-image pixel values corresponds to a number of suspected target pixels in the sub-image and a second portion of the sub-image pixel values corresponds to clutter pixels in the sub-image;

generating modeled pixel values using a clutter model fitted to the second portion of the sub-image pixel values; and subtracting the modeled pixel values from the sub-image pixel values to form new pixel values;

wherein fitting the clutter model to the second portion of the sub-image pixel values comprises:

identifying values for a first number of parameters for a pedestal-type function and a second number of parameters for a ramp-type function that cause a solution of the clutter model to include points corresponding to the clutter pixels that best fit the second portion of the sub-image pixel values corresponding to the clutter pixels within selected tolerances.

2. The method of claim 1 further comprising:

replacing the sub-image pixel values with the new pixel values to form a modified sub-image, wherein the clutter in the modified sub-image is reduced relative to the sub-image.

3. The method of claim 2 further comprising:

repeating the steps of identifying, generating, subtracting, and replacing for each location in a set of predefined locations to form a modified image, wherein the clutter in the modified image is reduced relative to the image.

4. The method of claim 3 further comprising:

determining whether a target object is present in the modified image using a selected threshold.

5. The method of claim 3 further comprising:

performing the steps of identifying, generating, subtracting, replacing, and repeating for each image in the number of images to form a number of modified images, wherein the clutter in the number of modified images is reduced relative to the number of images.

6. The method of claim 1, wherein the step of identifying the values for the parameters for the clutter model comprises:

identifying the values for a third number of parameters for a parabolic-type function that cause the solution of the clutter model to include the points corresponding to the clutter pixels that best fit the second portion of the sub-image pixel values corresponding to the clutter pixels within the selected tolerances.

7. The method of claim 1, further comprising:

selecting the location from a set of predefined locations; and identifying the sub-image in the image at the location selected.

8. The method of claim 7, wherein the step of identifying the sub-image in the image at the location selected comprises:

moving a window to the location selected, wherein the window comprises a suspected target region and a clutter region around the suspected target region; and identifying a portion of the image overlapped by the window as the sub-image, wherein the suspected target region of the window overlaps the number of suspected target pixels in the sub-image and the clutter region of the window overlaps the clutter pixels in the sub-image.

9. The method of claim 1 further comprising:

receiving the number of images from a sensor system, wherein the number of images captures a scene.

10. An image processing system comprising:

a clutter model;

a clutter reducer configured to identify sub-image pixel values for a sub-image at a location in an image in which a first portion of the sub-image pixel values corresponds to a number of suspected target pixels in the sub-image and a second portion of the sub-image pixel values corresponds to clutter pixels in the sub-image, generate modeled pixel values using the clutter model fitted to the second portion of the sub-image pixel values, and subtract the modeled pixel values from the sub-image pixel values to form new pixel values; and a model manager configured to fit the clutter model to the second portion of the sub-image pixel values by identifying values for a first number of parameters for a pedestal-type function and a second number of parameters for a ramp-type function that cause a solution of the clutter model to include points corresponding to the clutter pixels that best fit the second portion of the sub-image pixel values within selected tolerances.

11. The image processing system of claim 10, wherein the clutter reducer is configured to replace the sub-image pixel values with the new pixel values to form a modified sub-image, wherein clutter in the modified sub-image is reduced relative to the sub-image.

12. The image processing system of claim 11, wherein the location is selected from a set of predefined locations and wherein the clutter reducer is configured to identify the sub-image pixel values for the sub-image at the location in the image, generate the modeled pixel values using the clutter model fitted to the second portion of the sub-image pixel values, subtract the modeled pixel values from the sub-image pixel values to form the new pixel values for the modified sub-image, and replace the sub-image with the modified sub-image for each location in the set of predefined locations to form a modified image, wherein the clutter in the modified image is reduced relative to the image.

13. The image processing system of claim 12 further comprising:

an object detector configured to determine whether a target object is present in the modified image using a selected threshold;

wherein the image is selected from a number of images and wherein the clutter reducer is configured to form a number of modified images in which the clutter in the number of modified images is reduced relative to the number of images.

14. A computer program product for reducing clutter in a number of images, the computer program product comprising:

a nontransitory computer recordable storage medium;

program code, stored on the nontransitory computer recordable storage medium, for identifying sub-image pixel values for a sub-image at a location in an image in the number of images, wherein a first portion of the sub-image pixel values corresponds to a number of suspected target pixels in the sub-image and a second portion of the sub-image pixel values corresponds to clutter pixels in the sub-image;

program code, stored on the nontransitory computer recordable storage medium, for generating modeled pixel values using a clutter model fitted to the second portion of the sub-image pixel values; and program code, stored on the nontransitory computer recordable storage medium, for subtracting the modeled pixel values from the sub-image pixel values to form new pixel values;

wherein program code, stored on the nontransitory computer recordable storage medium, for fitting the clutter model to the second portion of the sub-image pixel values comprises:
program code, stored on the nontransitory computer recordable storage medium, for identifying values for a first number of parameters for a pedestal-type function and a second number of parameters for a ramp-type function that cause a solution of the clutter model to include points corresponding to the clutter pixels that best fit the second portion of the sub-image pixel values corresponding to the clutter pixels within selected tolerances.

15. The computer program product of claim 14 further comprising:
program code, stored on the nontransitory computer recordable storage medium, for replacing the sub-image pixel values with the new pixel values to form a modified sub-image, wherein the clutter in the modified sub-image is reduced relative to the sub-image; and
program code, stored on the nontransitory computer recordable storage medium, for repeating the steps of identifying the sub-image pixel values, generating the modeled pixel values, subtracting the modeled pixel values from the sub-image pixel values to form the new pixel values, and replacing the sub-image pixel values with the new pixel values to form the modified sub-image, wherein the clutter in the modified image is reduced relative to the image.

16. The method of claim 1,
wherein the number of suspected target pixels are one or more pixels in which a target object in a scene captured by the number of images is expected to be captured in the sub-image;
wherein the target object is one of an aircraft, an unmanned aerial vehicle (UAV), a projectile, a watercraft, a spacecraft, a vehicle, and a weather phenomenon; and
wherein the number of images comprise one or more of radar images, infrared images, ultraviolet images, and visible light images.

* * * * *